United States Patent [19]

Christoffel

[11] 4,159,162
[45] Jun. 26, 1979

[54] SILENCER FOR ELECTRIC MOTION PICTURE SCREENS

[75] Inventor: Eddie W. Christoffel, Pierceton, Ind.

[73] Assignee: Da-Lite Screen Co. Inc., Warsaw, Ind.

[21] Appl. No.: 908,072

[22] Filed: May 22, 1978

[51] Int. Cl.² .................. G03B 21/56; H02K 5/24
[52] U.S. Cl. ........................... 350/117; 160/24; 310/51; 310/91
[58] Field of Search ............. 310/51, 91; 160/24; 350/117

[56] References Cited

U.S. PATENT DOCUMENTS

| | | | |
|---|---|---|---|
| 3,330,515 | 7/1967 | Janssen et al. | 310/51 UX |
| 3,459,978 | 8/1969 | Truck et al. | 310/51 |
| 3,463,954 | 8/1969 | Latta | 310/51 X |
| 3,527,969 | 9/1970 | Papst | 310/51 |
| 3,546,504 | 12/1970 | Janssen et al. | 310/51 |
| 3,942,868 | 3/1976 | Hoffbauer et al. | 350/117 |
| 4,060,310 | 11/1977 | Brown | 350/117 |

*Primary Examiner*—Richard A. Wintercorn
*Attorney, Agent, or Firm*—Rummler & Snow

[57] ABSTRACT

This invention relates to electric projection screens to effect the coordinated shifting of the screen surface into and out of picture-projecting position of the type mounted in or to the ceiling or to the wall of a room and more particularly to a means to quiet the operation of the screen roller tube and its appendages during rotation of the roller tube.

2 Claims, 9 Drawing Figures

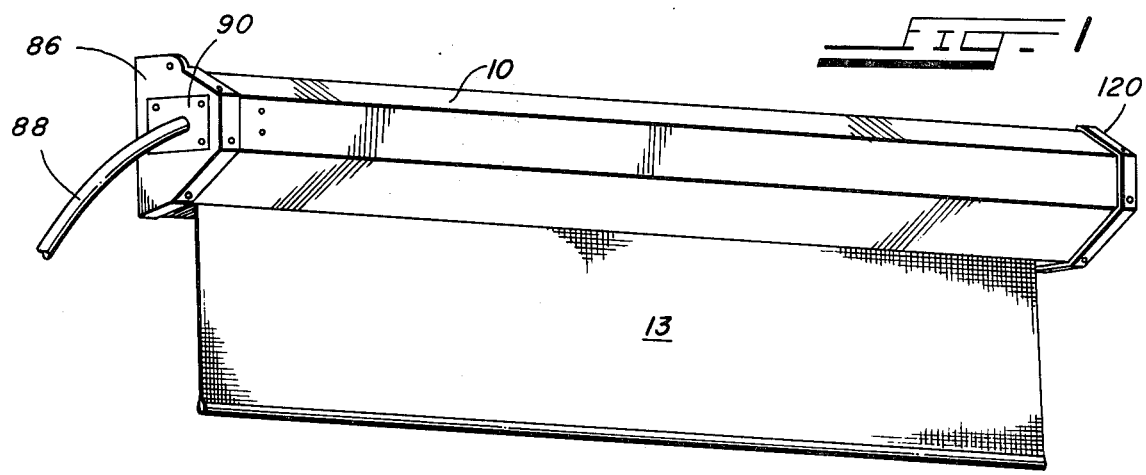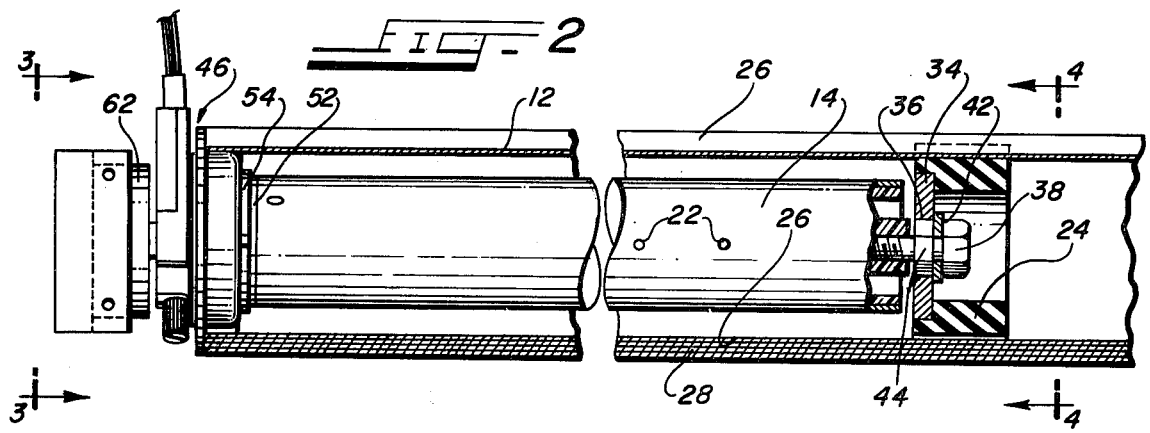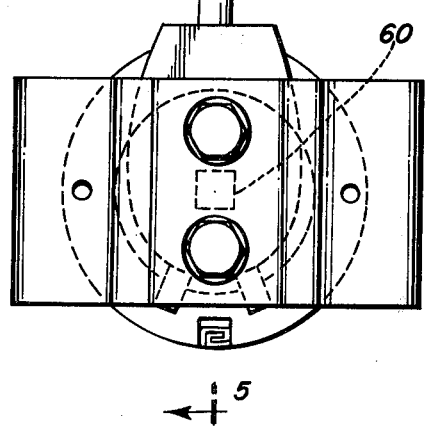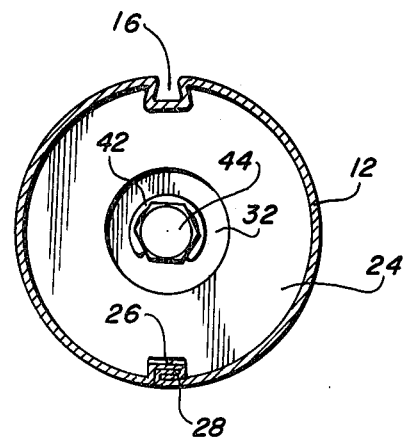

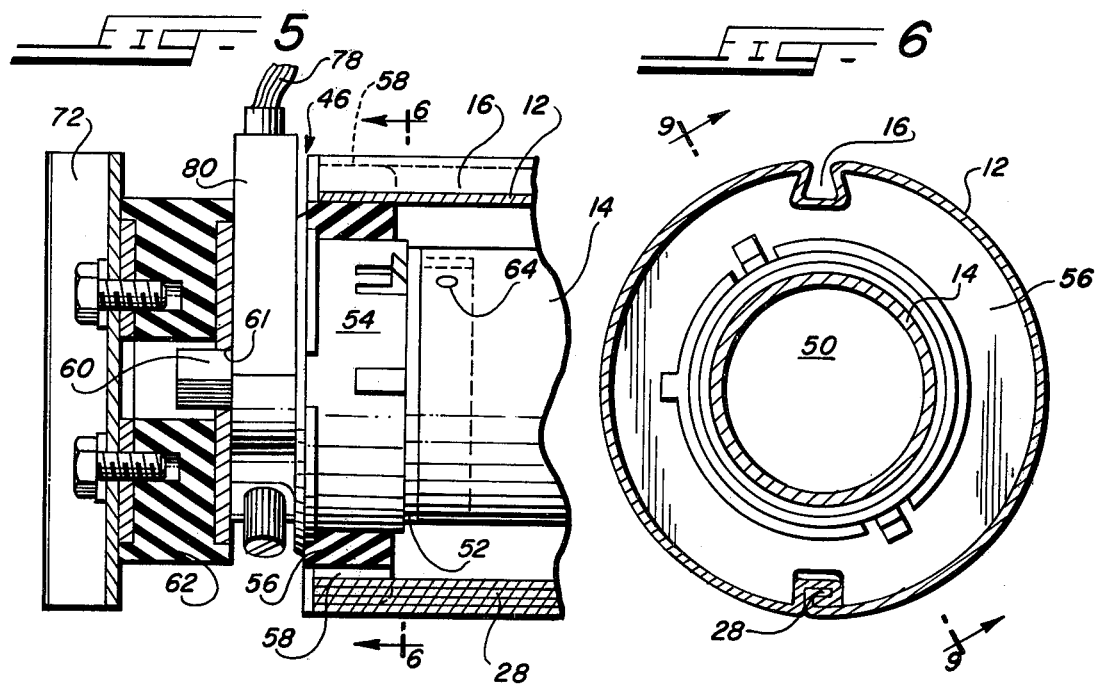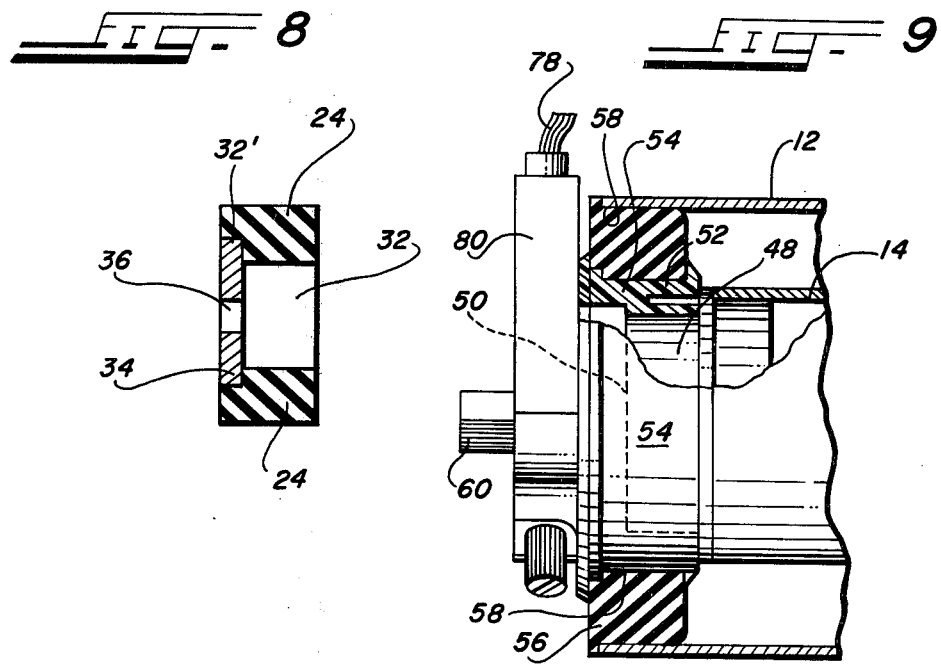

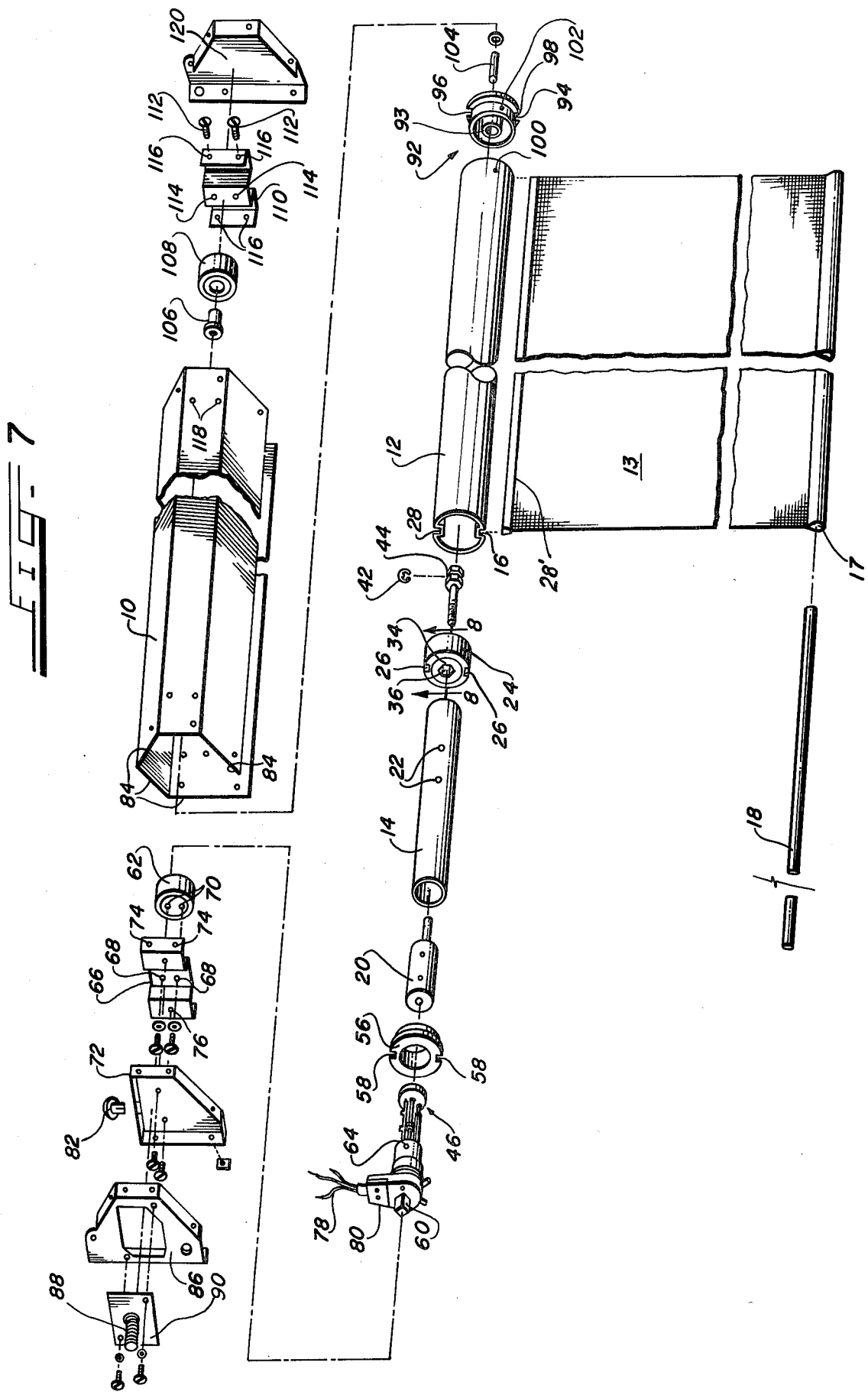

SILENCER FOR ELECTRIC MOTION PICTURE SCREENS

BACKGROUND OF THE INVENTION

Electrically-operated projection screens are extremely noisy in operation because of the metal-to-metal contact of the parts, including gearing. It was to overcome the defect and produce a silent operating screen that the present invention was conceived.

SUMMARY OF THE INVENTION

Means to reduce the noise level in a reversible motor-operated projection screen wherein the motor, its appendages and an indexing mechanism are encased in a short tube and this motor tube is axially positioned in the screen roller tube, a series of rubber noise reducers containing axial grooves in their circumference to seat in an axially-aligned internal rib of the screen roller tube and the outer edges of the groove for locking one end of the screen fabric, respectively, one of the rubber noise reducers rotating the roller tube as well as spacing the motor tube from the screen roller tube, and rubber noise reducers adjacent the ends of said roller tube.

BRIEF DESCRIPTION OF THE DRAWINGS

FIG. 1 is a perspective view of a screen outer casing and a screen fabric shown partially extending downwardly therefrom;

FIG. 2 is a vertical cross-sectional view through the screen roller tube, the motor tube shown in full lines with the right end broken away and showing the driving noise reducer in cross-section;

FIG. 3 is an end elevational view taken on the line 3—3 of FIG. 2;

FIG. 4 is a cross-sectional view taken on the line 4—4 of FIG. 2;

FIG. 5 is a cross-sectional view taken on the line 5—5 of FIG. 3, with parts broken away;

FIG. 6 is a cross-sectional view taken on the line 6—6 of FIG. 5 showing the end of the motor tube;

FIG. 7 is an exploded perspective view of the screen casing, screen roller, motor roller tube and screen fabric with the appendages;

FIG. 8 is a cross-sectional view taken on the line 8—8 of FIG. 7; and

FIG. 9 is a cross-sectional view taken on the line 9—9 of FIG. 6.

DETAILED DESCRIPTION OF THE DRAWINGS

Noise level reduction is the concept of the present invention as applied to a motor-operated picture projection screen which is secured either in or to a ceiling or on a wall of a room to effect whisper quiet operation of the device when operating to shift the screen surface into or out of picture-projection position.

The motor-operated screen comprises an outer casing 10 into which an axially-positioned screen roller tube 12 is housed and on which the viewing screen is rolled or unrolled and an axially-aligned and short motor tube 14 is housed within and spaced from tube 12.

The screen tube 12 is constructed of one piece and spaced from the casing 10 and is fully shown in applicant's assignee's U.S. Pat. No. 3,724,524 granted Apr. 23, 1973, and also discloses how one end 28' of the screen fabric 13 is locked in groove 16. The lower end of the viewing screen has a pocket 17 into which a bar 18 is inserted. The screen fabric is rolled and unrolled from this tube 12.

The stationary motor tube 14 contains an elongated motor 20 anchored to the tube by rivets shown by the circles 22. An enlarged, semi-rigid, cylindrical rubber member 24 is positioned on the inner end of the motor tube. The rubber member 24 has a diameter substantially equal to the inner diameter of the screen tube 12, which has opposed grooves 26 in one of which the inner seam 28 seats while the other seats around the exterior of the triangular groove 16. One end of the screen fabric is seated at 28 in the triangular groove as aforementioned. The rubber member 24 has an enlarged axial opening 32 therein. A second axial opening 32' is formed in the forward end of the rubber member 24 to receive a hard metal washer 34 which is molded and anchored therein, as shown in FIG. 8. The washer 34 is provided with an axial hexagonally-shaped aperture 36. A hexagonal drive shaft is provided from the motor. The shaft 44 is provided with a circular groove approximately medially of its ends for the reception of a split lock-washer 42 whereby the forward part of the shaft seats in the hexagonal aperture 36. Thus the rubber member will rotate when the motor 20 is energized.

The free end of the motor is connected by appropriate wiring to a limit switch 46, heretofore patented as U.S. Pat. No. 3,718,215 issued Feb. 27, 1973, and details thereof will not be described. This switch controls the distance the screen fabric 13 extends outwardly of the casing 10 and determines when the fabric 13 is completely wound on the roller tube 12. However, one feature not shown in the patent is the left end of the limit switch, as shown in the drawings, namely a cylindrical metal portion 48 having an axial bore terminating in a wall 50. One end of the limit switch mechanism is mounted on the wall 50. A groove 52 is formed on the outer surface of the portion 48 to receive a plastic, rotary, wide ring 54 having its margins turned upwardly to receive a cylindrical rubber silencer member 56. The silencer 56 is axially perforated to seat on ring 54. The member 56 is also provided with a pair of grooves 58 to seat the seam 28 and the exterior of the triangular-shaped groove 16, respectively. The outer end of the limit switch 46 is provided with a stationary metal member 80 containing the wires 78 and is provided with an axially-aligned, square in cross-section stub 60 to seat in a square in cross-section seat 61 of the circular rubber support 62 on the end of the outer casing 10, which will later be described. The motor tube is secured to the metal portion 48.

In assembling the left hand end, as shown in FIG. 7, the rubber silencer 62 is anchored to the bracket 66 through apertures 68 and 70 of the rubber support 62 after the support has been placed on the stub 60. This bracket 66 is then anchored to a second bracket 72 by appropriate self-threading screws in perforations 74, 76. Thus the stub 60 cannot rotate.

The electric wires 78 extending from the member 80 are inserted through the grommet 82 in the upper walls of the bracket 72, which wall is spaced from the adjacent wall of the outer casing 10 when axially seated therein.

The end cap 86 is secured over the end walls 84 of casing 10 and appropriately anchored thereto. The end cap 68 is spaced from second bracket 72 to provide an area for hooking up the wires 78 to the wires from conduit 88 secured to the removable plate 90 on the end cap 86. The opposite end of the conduit is electrically connected to a source of power through an appropriate reversing switch, not shown.

The right hand end of the tube 12, as shown in FIG. 7, is provided with a hollow cap 92 having a cylindrical wall 94 insertable in tube 12 with cutouts 94, 96 into which are seated exteriorally to the groove 16 and seam 28, respectively. This member 92 is anchored to the tube 12 by appropriate screws in the respective apertures 100, 102. An axial tube 93 is positioned in the cap 92 to receive a portion of pin 104 by press fit. The other end of the pin is inserted in a nylon bearing 106 axially mounted in a cylindrical rubber member 108 which is similar to the member 62. The member 108 is anchored to bracket 110 by appropriate screws through the perforations 114. This bracket 110 is mounted interiorly of the casing 10 by appropriate screws 112 in perforations 116, 118, respectively. The end cap 120 is secured to the casing in the same manner as end cap 86. Thus this end of the tube 12 is rotatable.

In operation, the wires 78 are electrically connected appropriately to the motor 20 and a source of current through conduit 88. Upon energization of the motor 20, the shaft 40 will rotate the rubber silencer 24 which, in turn, will rotate the screen tube 12, because of the grooves 24, 26 which surround the seam 28 and triangular groove 16, respectively. The screen tube is also supported at one end by the driven rubber silencer 56 rotatable on ring 54. This silencer 56 also has grooves 58 in which seat the seam 28 and triangular groove 16 of the roller tube, thus it will rotate with the screen roller 12. Also, since the limit switch 46 is stationary, being anchored to the motor tube 14 by screws 64, the square in cross-section stub 60 appended to the limit switch 46 will seat axially in the square in cross-section seat 61 in the stationary rubber silencer member support 62, thus allowing the tube 12 to rotate. The opposite end of tube 12 will rotate about the pin 104 in the nylon bushing 108.

Thus the screen tube will be whisper quiet upon unrolling or rolling up the screen 13 during rotation thereof as there is no metal-to-metal contact to cause noise upon energizing of the motor.

Although but one specific embodiment of this invention is herein shown and described, it will be understood that details of the construction shown may be altered or omitted without departing from the spirit of the invention as defined by the following claim.

I claim:

1. A silencer for motorized projection screens whereby the screen fabric may be shifted into and out of its case, the device comprising a motor tube, picture screen roller tube axially positioned therein in spaced relationship, said tube having an inner longitudinal seam and an opposed longitudinal, inverted, V-like screen fabric attaching groove, an outer casing, said screen roller tube axially positioned in said casing in spaced relationship thereto, a reversible motor in said motor tube, electrical means to energize the motor, in combination with a cylindrical rubber silencer member anchored to the motor shaft, having a diameter substantially equal to the inner diameter of said roller tube and provided with opposed grooves for seating around said seam of said roller tube and the opposed, inverted, V-like screen fabric attachment groove for rotating the screen roller tube, a rotatable plastic collar on the end opposite the rubber member having circumferential marginal flanges, a second cylindrical rubber member on said collar having opposed grooves for seating around said roller screen seam and the opposed, inverted, V-like groove, a third rubber member seated in the end of said roller screen and anchored thereto and having opposed grooves for seating around the said seam and inverted, V-like groove, respectively, a pin anchored in and extending outwardly of said bearing, a stationary fourth rubber means provided with an axial cylindrical bearing for seating the extending portion, and means to close the ends of said casing, whereby, upon energization of the motor, the first rubber member will silently rotate the screen roller tube along with the second rotatable rubber member and about the pin in its bearing.

2. An electric motion picture projection screen having a casing, a screen fabric roller tube positioned axially in said casing and having a picture projection screen fabric rolled up thereon, a motor tube positioned axially in a portion of said roller tube, a motor in said motor tube, a first driven cylindrical rubber means on one end of said motor housing cooperating with the roller tube, a second cylindrical rubber means secured to said motor for driving said roller tube, said second rubber means positioned on the other end of said motor tube, and electrical means for driving said motor.

* * * * *